(12) United States Patent
Murata

(10) Patent No.: US 6,212,017 B1
(45) Date of Patent: Apr. 3, 2001

(54) SOFT FOCUS LENS SYSTEMS

(75) Inventor: Masayuki Murata, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/450,339

(22) Filed: Nov. 29, 1999

(30) Foreign Application Priority Data

Nov. 30, 1998 (JP) .................................................. 10-340076

(51) Int. Cl.$^7$ .................................................. G02B 15/14
(52) U.S. Cl. ............................................ 359/690; 359/687
(58) Field of Search .................................... 359/690, 689, 359/686–688, 683, 676

(56) References Cited

U.S. PATENT DOCUMENTS

| | | | |
|---|---|---|---|
| 4,826,301 | * 5/1989 | Ikemori | 359/740 |
| 5,822,132 | 10/1998 | Hirakawa | 359/691 |
| 5,841,590 | * 11/1998 | Sato | 359/763 |
| 5,991,093 | * 11/1999 | Murata et al. | 359/691 |

* cited by examiner

*Primary Examiner*—Georgia Epps
*Assistant Examiner*—Jordan M. Schwartz

(74) *Attorney, Agent, or Firm*—Greenblum & Bernstein, P.L.C.

(57) ABSTRACT

A soft-focus zoom lens system including a positive front lens group, a negative intermediate lens group, and a positive rear lens group, in this order from the object. Zooming is performed by varying axial distances among the front, intermediate and rear lens groups. The zoom lens system satisfies the following conditions:

$$SAU/fw < -0.10 \qquad (1)$$

$$0.30 < D_{23w}/fw \qquad (2)$$

$$0.25 < D_{12t}/ft \qquad (3)$$

wherein: SAU designates the amount of spherical aberration at an open aperture, with respect to a focal length at which the amount of spherical aberration, upon zooming, becomes the smallest; fw designates the focal length of the entire lens system at the short focal length extremity; $D_{23w}$ designates the axial distance, at the short focal length extremity, between the most image-side surface of the intermediate lens group and the most object-side surface of the rear lens group; $D_{12t}$ designates the axial distance, at the long focal length extremity, between the most image-side surface of the front lens group and the most object-side surface of the intermediate lens group; and ft designates the focal length of the entire zoom lens system at the long focal length extremity.

4 Claims, 18 Drawing Sheets

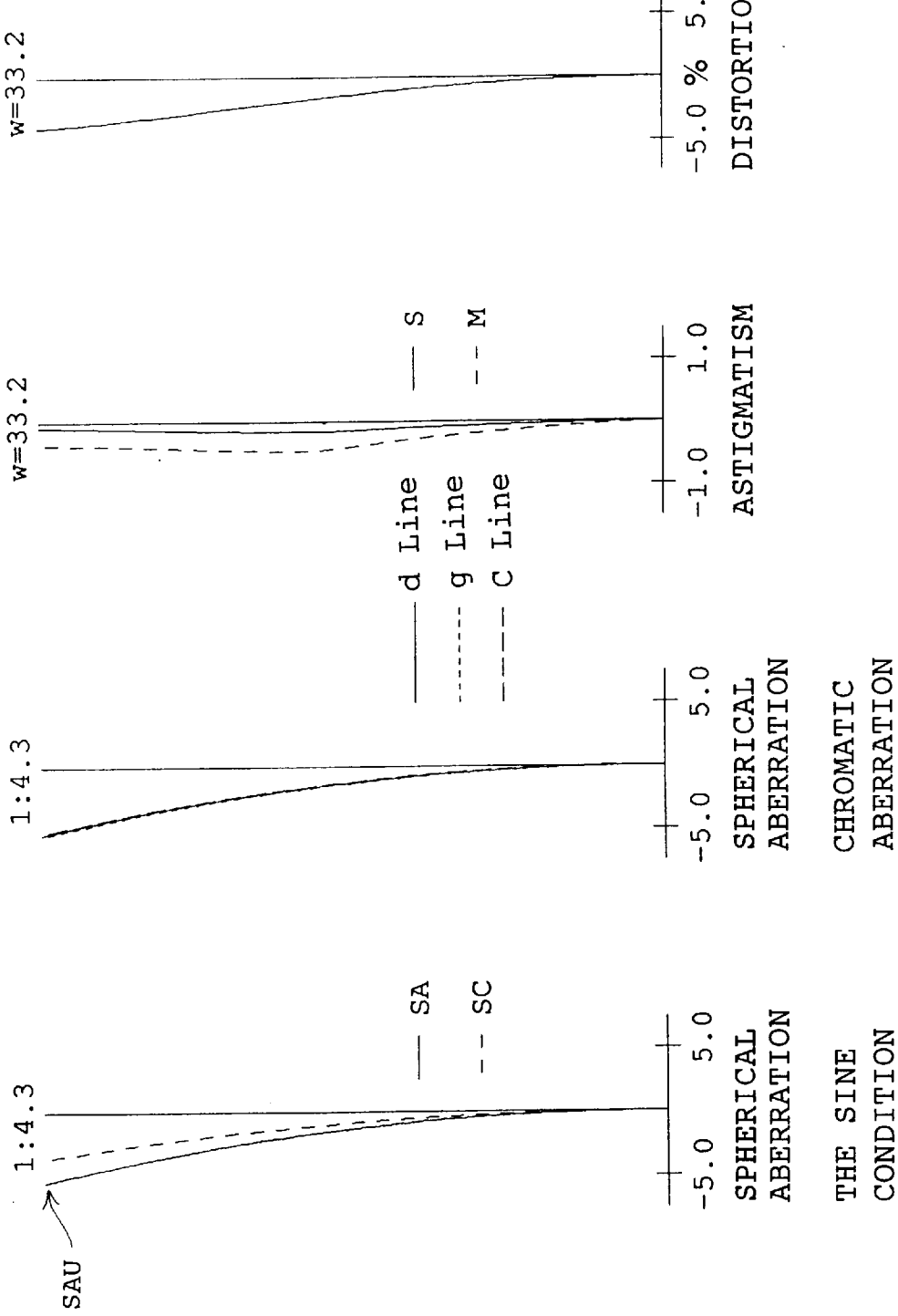

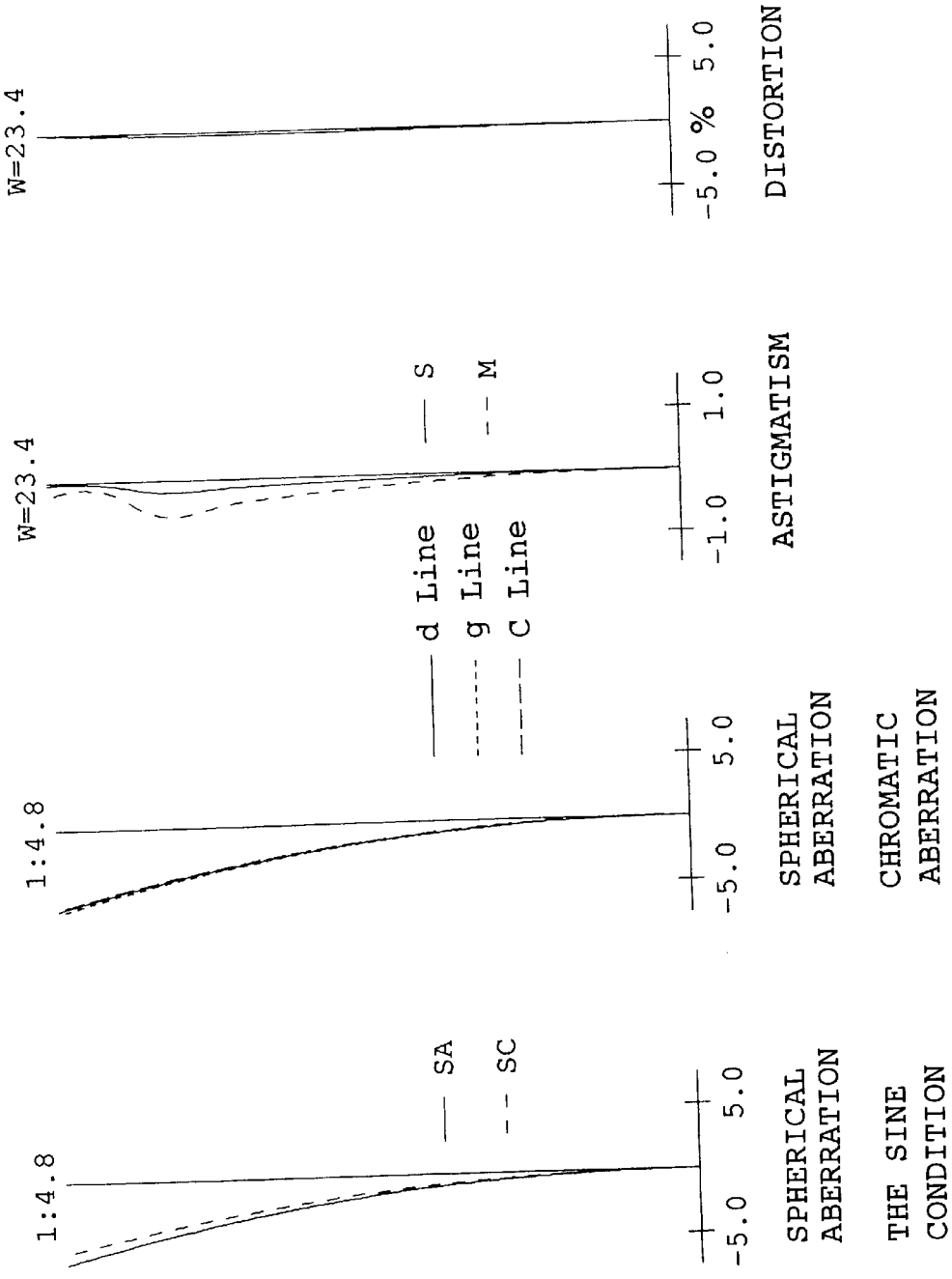

SOFT FOCUS LENS SYSTEMS

BACKGROUND OF THE INVENTION

1. Field of the Invention

The present invention relates to a soft-focus zoom lens system having a soft-focusing effect over a range from a shorter focal length toward a medium-longer focal length, the zoom lens system which can be utilized in an interchangeable photographing lens for a single lens reflex camera.

2. Description of the Related Art

A soft-focus lens system has conventionally been used for taking portraits, and has therefore been employed in a medium-telephoto photographing lens having a relatively narrower angle-of-view. On the other hand, a soft-focus lens system has recently been employed even in a photographing lens having a wider angle-of-view in order to take photographs of distant views such as landscapes and the like. However, a zoom lens system having a soft-focusing effect over a range from a shorter focal length toward a medium-longer focal length has not been provided.

SUMMARY OF THE INVENTION

It is an object of the present invention to provide a soft-focus zoom lens system through which a soft-focusing effect can be obtained in photographing of both distant views, such as landscapes, and portraits.

In order to achieve the above mentioned object, there is provided a soft-focus zoom lens system including a positive front lens group, a negative intermediate lens group, and a positive rear lens group, in this order from the object. Zooming is performed by respectively moving the front lens group, the intermediate lens group, and the rear lens group, along the optical axis. The zoom lens system satisfies the following conditions:

$$SAU/fw < -0.10 \quad (1)$$

$$0.30 < D_{23w}/fw \quad (2)$$

$$0.25 < D_{12t}/ft \quad (3)$$

wherein

SAU designates the amount of spherical aberration at an open aperture, with respect to a focal length at which the amount of spherical aberration, upon zooming, becomes the smallest;

fw designates the focal length of the entire lens system at the short focal length extremity;

$D_{23w}$ designates the axial distance, at the short focal length extremity, between the most image-side surface of the intermediate lens group and the most object-side surface of the rear lens group;

$D_{12t}$ designates the axial distance, at the long focal length extremity, between the most image-side surface of the front lens group and the most object-side surface of the intermediate lens group; and ft designates the focal length of the entire zoom lens system at the long focal length extremity.

In the soft-focus zoom lens system according to the present invention, in order to generate spherical aberration and reduce the occurrences of other off-axis aberrations, the rear lens group preferably includes at least one positive lens element, and a diaphragm is positioned between the intermediate lens group and the rear lens group. Further, the zoom lens system preferably satisfies the following condition:

$$0.5 < r_{R-1}/fw < 1.6 \quad (4)$$

wherein $r_{R-1}$ designates the radius of curvature of the object-side surface of the most object-side positive lens element in the rear lens group.

The soft-focus zoom lens system according to the present invention preferably has a wider half angle-of-view at the short focal length extremity to the extend that the lens system satisfies the following condition:

$$25° < Ww \quad (5)$$

wherein

Ww designates the half angle-of-view at the short focal length extremity.

The present disclosure relates to subject matter contained in Japanese Patent Application No.Hei-10-340076 (filed on Nov. 30, 1998) which is expressly incorporated herein by reference in its entirety.

BRIEF DESCRIPTION OF THE DRAWINGS

The invention will be discussed below in detail with reference to the accompanying drawings, in which:

FIGS. 14A, 14B, 14C and 14D are aberration diagrams of the lens system of FIG. 13 at the short focal length extremity;

FIGS. 15A, 15B, 15C and 15D are aberration diagrams of the lens system of FIG. 13 at an intermediate focal length position;

DESCRIPTION OF THE PREFERRED EMBODIMENTS

Figure 17:
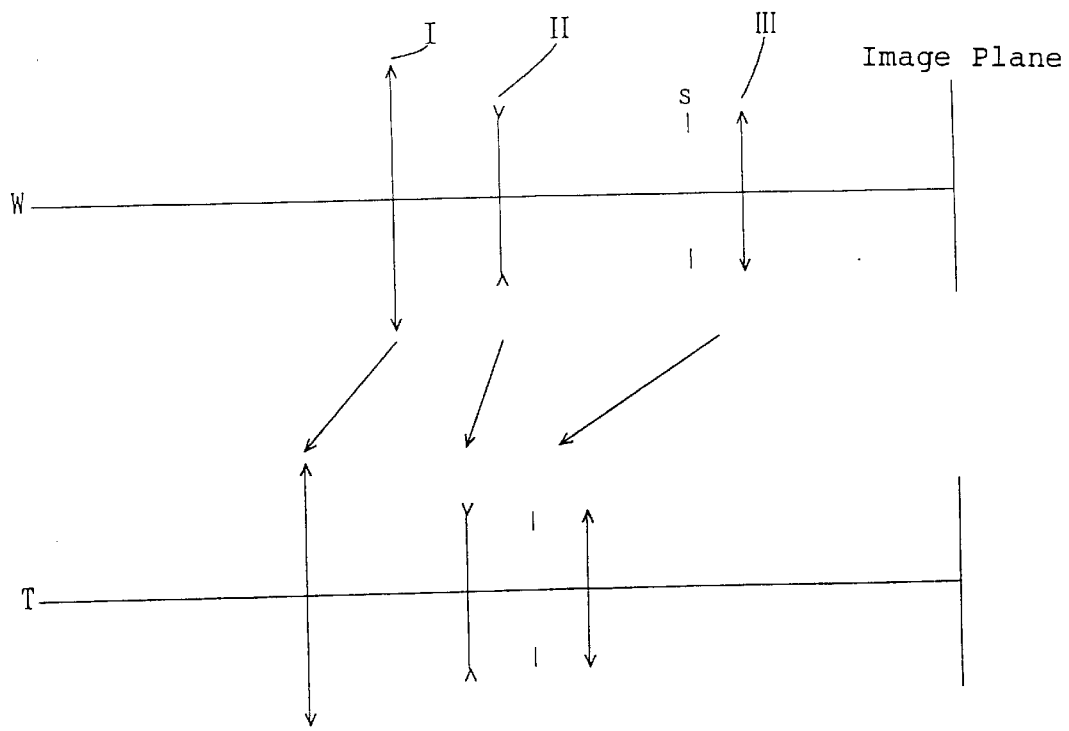
FIG. 17 shows the lens-group moving paths, upon zooming, of the fourth embodiment according to the present invention.
Figure 18:
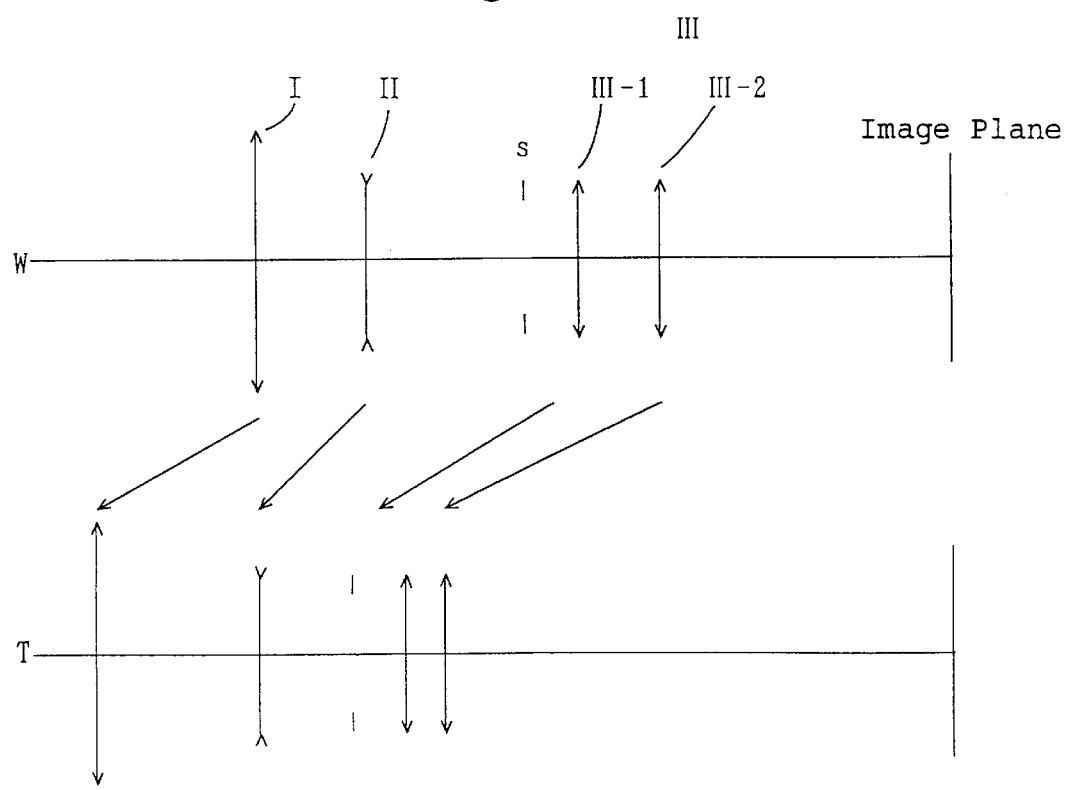
FIG. 18 shows the lens-group moving paths, upon zooming, of first and third embodiments according to the present invention.
Figure 19:
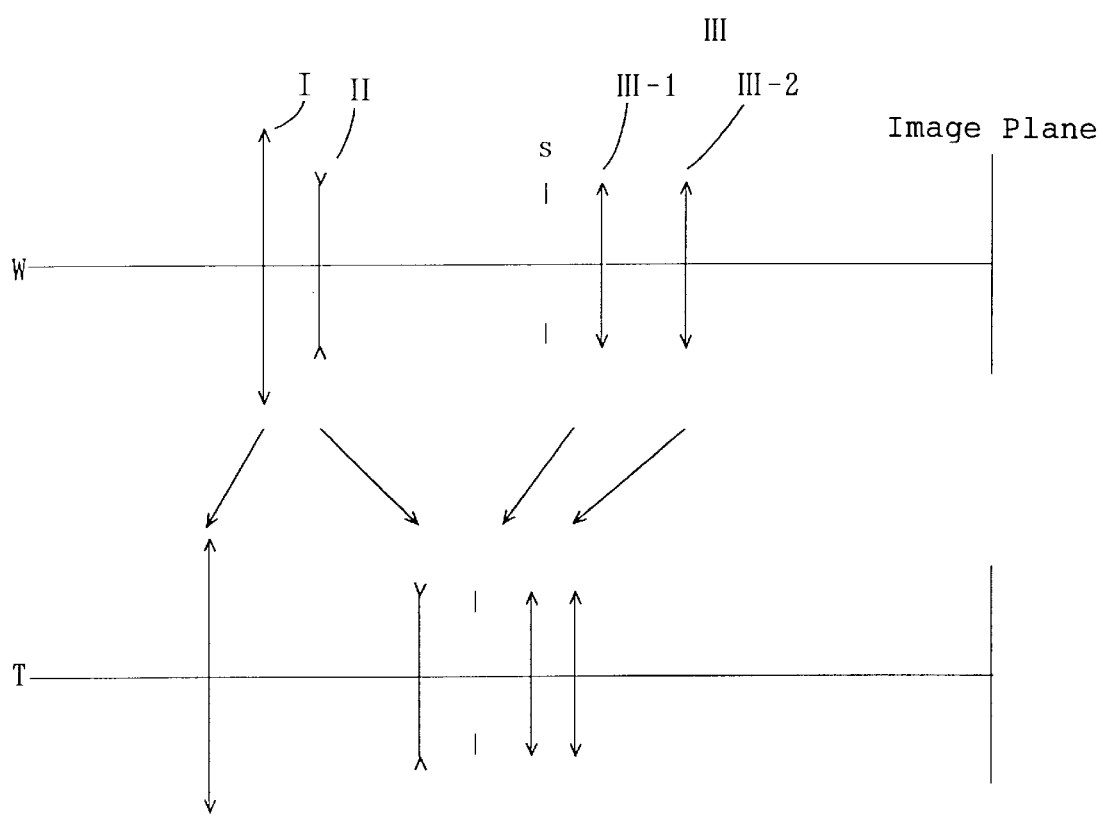
FIG. 19 shows the lens-group moving paths, upon zooming, of a second embodiment according to the present invention.

The basic lens arrangements of the soft-focus zoom lens system of the present invention are explained along with FIG. 17 (the fourth embodiment), FIG. 18 (the first and third embodiments) and FIG. 19 (the second embodiment). The soft-focus zoom lens system includes a positive front lens group I, a negative intermediate lens group II, and a positive rear lens group III, in this order from the object. When zooming is performed from the short focal length extremity toward the long focal length extremity, the axial distance between the front lens group I and the intermediate lens group II increases, and the axial distance between the intermediate lens group II and the rear lens group III decreases. Further, in FIGS. 17 and 18, all the lens groups I, II and III move toward the object while in FIG. 19 the front and rear lens groups I, III move toward the object, while the intermediate lens group II moves toward the image. A diaphragm is positioned between the intermediate lens group II and the rear lens group III, and integrally moves with the rear lens group III.

Moreover, as shown in FIGS. 18 and 19, the rear lens group III can be divided into a first sub lens group III-1 and a second sub lens group III-2 which are made relatively movable. When zooming is performed, these sub lens groups of the rear lens group III move toward the object, while the axial distance therebetween is reduced.

Condition (1) specifies the amount of spherical aberration which is normalized by the focal length. By satisfying this condition, undercorrected spherical aberration is occurred, and thereby a soft-focusing effect over a range from a shorter focal length toward a medium-longer focal length can be obtained, and an attractive blurry background on a photograph can be obtained.

If SAU/fw exceeds the upper limit of condition (1), the amount of spherical aberration is small, so that a soft-focusing effect cannot be obtained sufficiently.

Condition (2) specifies the ratio of the axial distance between the intermediate lens group II and the rear lens group III to the focal length at the short focal length extremity.

Condition (3) specifies the ratio of the axial distance between the front lens group I and the intermediate lens group II to the focal length at the long focal length extremity. By satisfying these conditions, a zoom lens system which even has a wider angle-of-view (i.e., a shorter focal length) can attain a zoom ratio of 2 or more.

If $D_{23w}$/fw exceeds the lower limit of condition (2), a zoom lens system cannot have a wider angle-of-view.

If $D_{12t}$/ft exceeds the lower limit of condition (3), an effect of zooming is reduced, and it becomes difficult to obtain a zoom ratio of 2 or more.

Condition (4) is for generating spherical aberration and for reducing the occurrences of other off-axis aberrations. It is understood that undercorrected spherical aberration occurs on a convex surface having strong positive power. Therefore in order to satisfy condition (4), by forming the convex surface on the object-side surface of the most object-side positive lens element, in the vicinity of the diaphragm, in the rear lens group III, only undercorrected spherical aberration can be occurred while the occurrences of coma, astigmatism and distortion are reduced as much as possible.

If $r_{R-1}$/fw exceeds the lower limit of condition (4), undercorrected spherical aberration is occurred; however, the correcting of other off-axis aberrations cannot be made sufficiently.

If $r_{R-1}$/fw exceeds the upper limit of condition (4), the amount of undercorrected spherical aberration is small, and thereby a sufficient soft-focusing effect cannot be obtained.

Condition (5) directly specifies the half angle-of-view at the short focal length extremity.

If Ww exceeds the lower limit of condition (5), a half angle-of-view appropriate for the soft-focus zoom system lens cannot be obtained, and the object of the present invention cannot be achieved.

Specific embodiments of the present invention will be described below.

Embodiment 1

Figure 1:
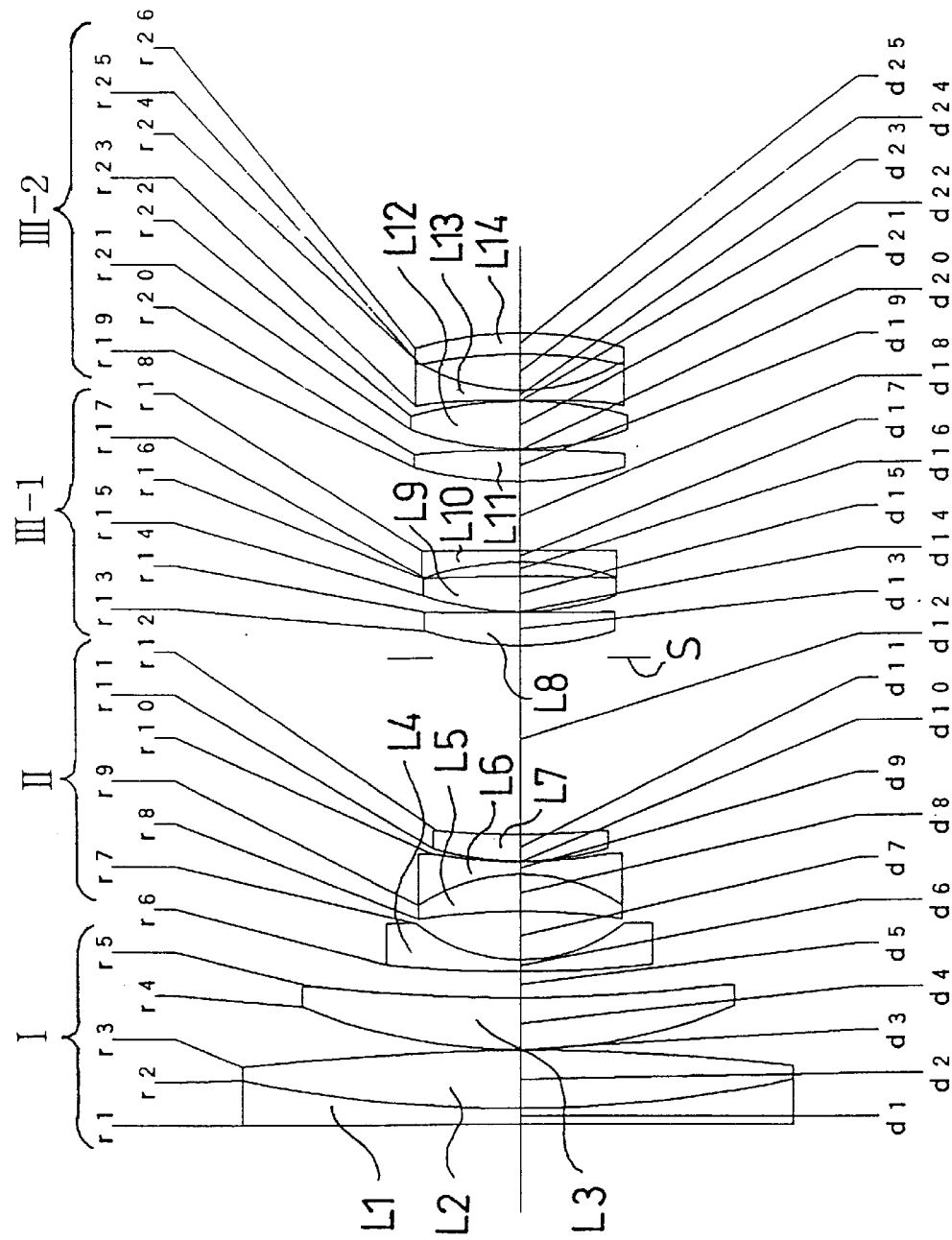
FIG. 1 is a lens arrangement of a first embodiment of a soft-focus zoom lens system according to the present invention.
Figure 2:
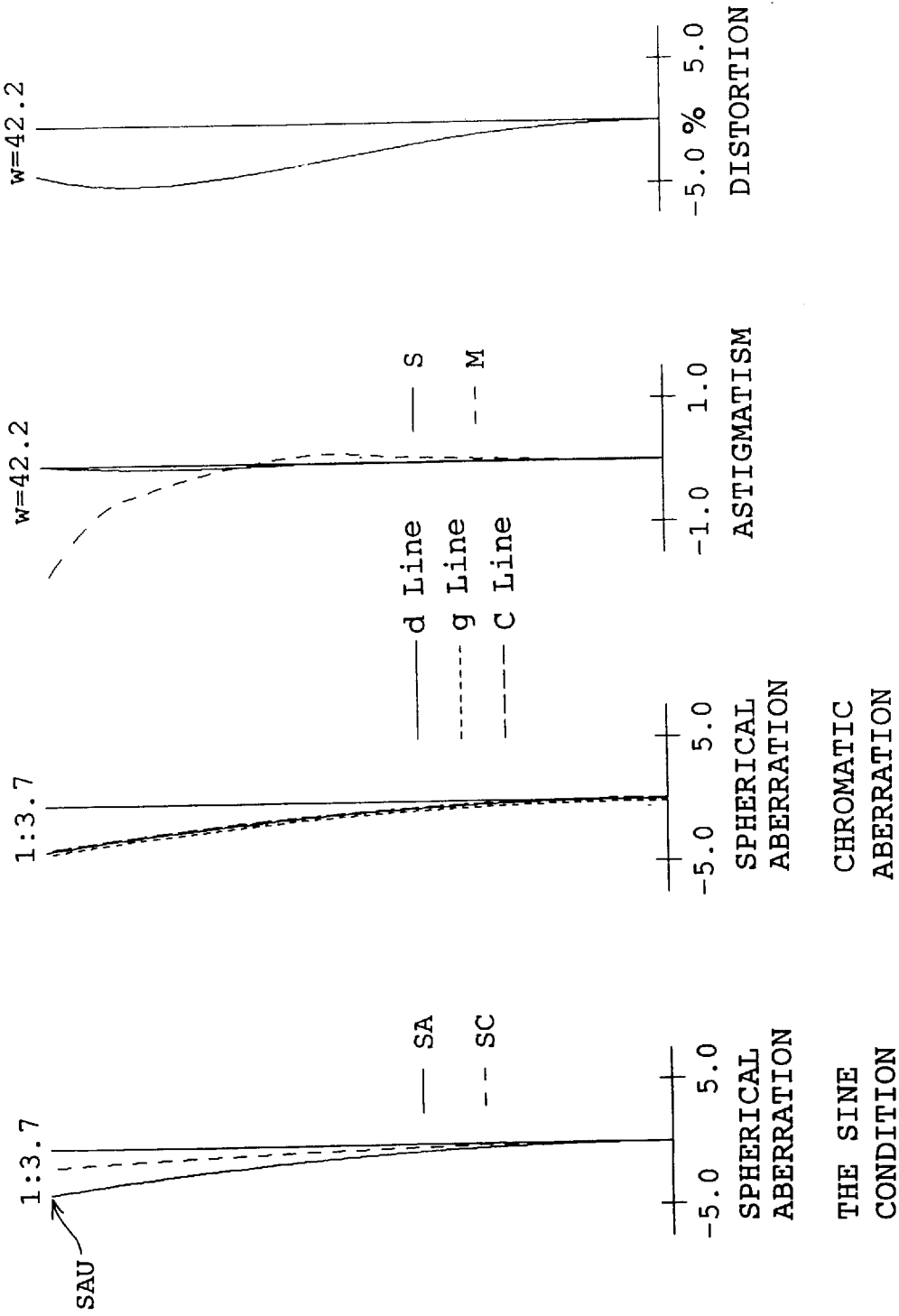
FIGS. 2A, 2B, 2C and 2D are aberration diagrams of the zoom lens system of FIG. 1 at the short focal length extremity.
Figure 3:
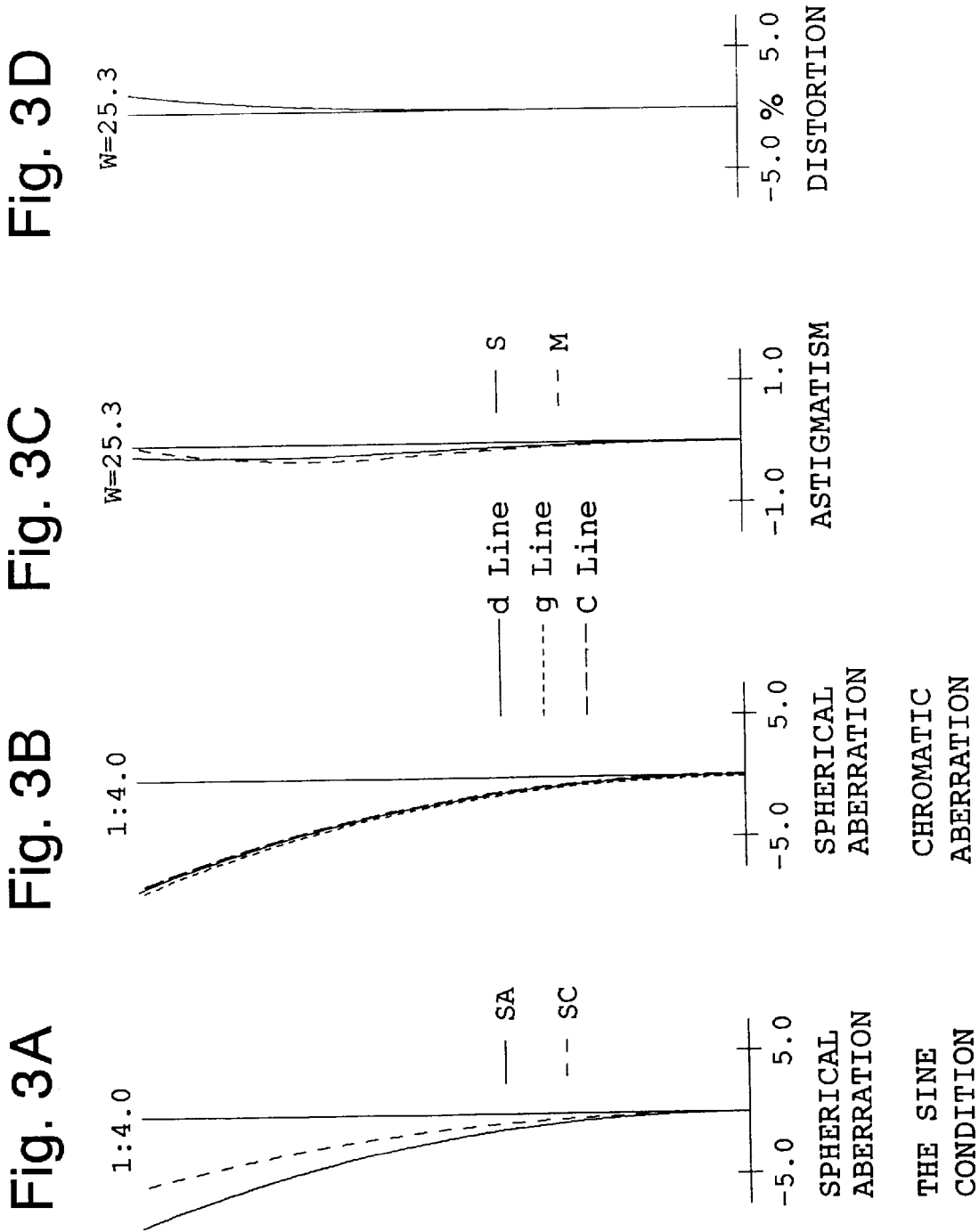
FIGS. 3A, 3B, 3C and 3D are aberration diagrams of the zoom lens system of FIG. 1 at an intermediate focal length position.
Figure 4:
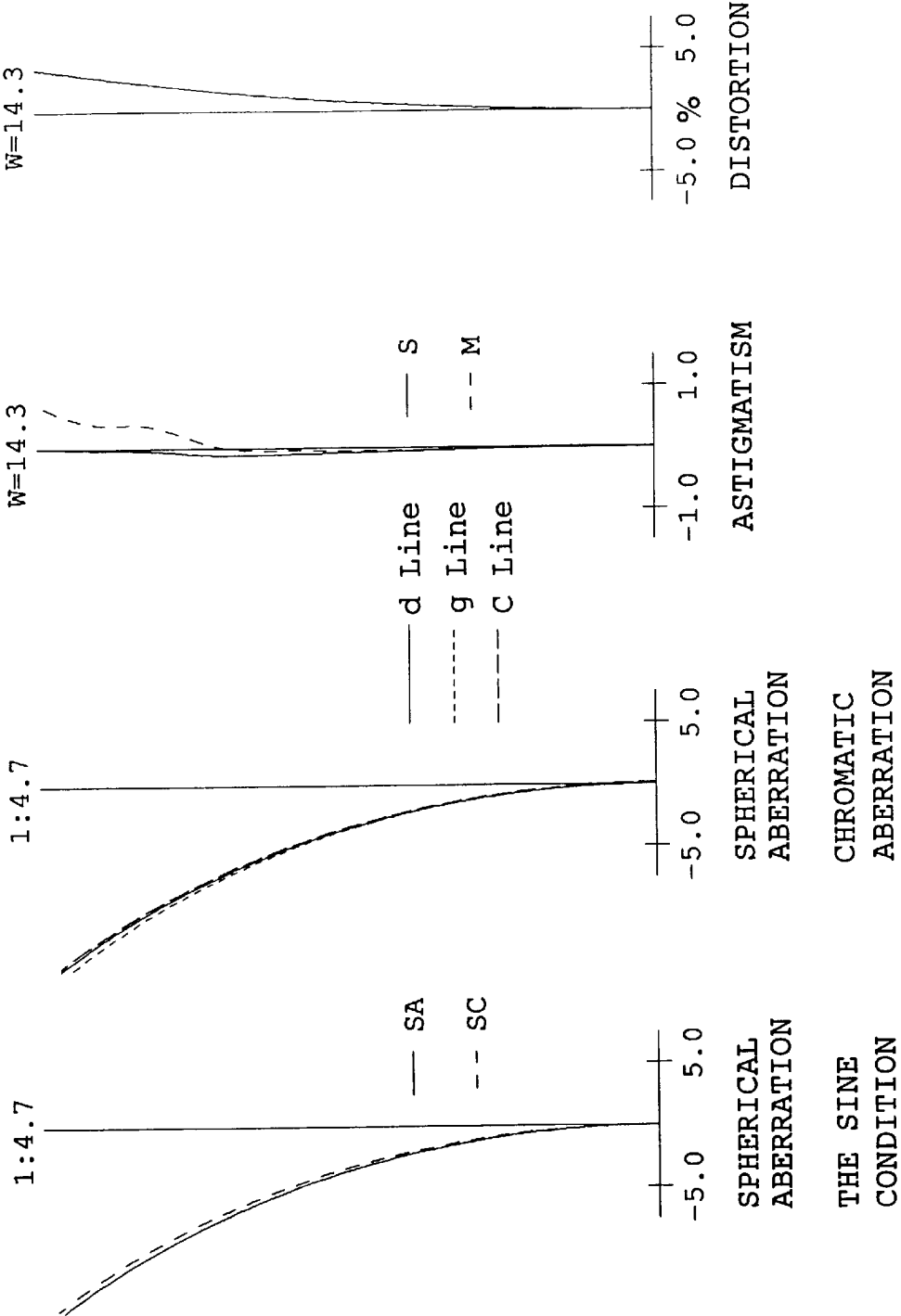
FIGS. 4A, 4B, 4C and 4D are aberration diagrams of the zoom lens system of FIG. 1 at the long focal length extremity.

FIG. 1 is a lens arrangement of the first embodiment of a soft-focus zoom lens system, and Table 1 shows the numerical data thereof. The soft-focus zoom lens system includes the positive front lens group I, the negative intermediate lens group II, a diaphragm S and the positive rear lens group III, in this order from the object. Further, the rear lens group III includes the first sub lens group III-1 and a second sub lens group III-2 which are made relatively movable. Zooming from the short focal length extremity toward the long focal length extremity is performed as shown in the lens-group moving paths of FIG. 18, i.e., all the lens groups I, II and III move toward the object, while the axial distance between the front lens group I and the intermediate lens group II increases, and the axial distance between the intermediate lens group II and the rear lens group III decreases. The positive front lens group I includes a cemented lens group having a negative lens element L1 and a positive lens element L2, a positive meniscus lens element L3 having a convex surface facing toward the object, in this order from the object. The negative intermediate lens group II includes a negative meniscus lens element L4, a cemented lens group having a positive lens element L5 and a negative lens element L6, and a positive meniscus lens element L7, in this order from the object. Further, in the rear lens group III, the first sub lens group III-1 includes a positive meniscus lens element L8, a positive lens element L9 and a negative meniscus lens element L10, in this order from the object; and the second sub lens group III-2 includes a positive lens element L11, a positive lens element L12, a negative lens element L13 and a positive meniscus lens element L14, in this order from the object.

FIGS. 2A through 2D are aberration diagrams of the zoom lens system of FIG. 1 at the short focal length extremity. FIGS. 3A through 3D are aberration diagrams of the zoom lens system of FIG. 1 at an intermediate focal length position. FIGS. 4A through 4D are aberration diagrams of the zoom lens system of FIG. 1 at the long focal length extremity. In the diagrams of spherical aberration and the sine condition, SA designates spherical aberration, and SC designates the sine condition. The amount of SAU becomes the smallest at the short focal length extremity. In the diagrams of chromatic aberration represented by spherical aberration, the solid lines and the two types of dotted lines respectively indicate spherical aberrations with respect to the d, g and C lines. In the diagrams of astigmatism, S designates the sagittal image, and M designates the meridional image.

In the tables and drawings, $F_{NO}$ designates the F-number, f designates the focal length of the entire lens system, W designates the half angle-of-view, $f_B$ designates the back focal distance, ri designates the radius of curvature of each lens surface, di designates the lens thickness or the distance between the lens elements, N designates the refractive index at the d-line, and v designates the Abbe number.

In addition to the above, an aspherical surface which is symmetrical with respect to the optical axis is defined as follows:

$$x = Ch^2/\{1+[1-(1+K)C^2h^2]^{1/2}\} + A4h^4 + A6h^6 + A8h^8 + A10h^{10}\ldots;$$

wherein:

x designates a distance from a tangent plane of an aspherical vertex;

C designates a curvature of the aspherical vertex (1/r);

h designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a eighth-order aspherical coefficient.

TABLE 1

$F_{NO} = 1:3.7–4.0–4.7$
$f = 24.86–45.01–82.00$ (Zoom Ratio = 3.30)
$W = 42.2–25.3–14.3$
$f_B = 38.50–55.16–71.25$
$SAU = -3.70$
$D_{23w} = 18.31$
$D_{12t} = 25.30$
$r_{R-1} = 32.014$

| Surface No. | ri | di | N | v |
|---|---|---|---|---|
| 1 | 31783.807 | 1.50 | 1.84666 | 23.8 |
| 2 | 123.864 | 5.60 | 1.69680 | 55.5 |
| 3 | −240.094 | 0.10 | — | — |
| 4 | 53.214 | 5.00 | 1.69680 | 55.5 |
| 5 | 166.181 | 2.49–10.70–25.30 | — | — |
| 6 | 118.092 | 1.10 | 1.80400 | 46.6 |
| 7 | 16.017 | 4.71 | — | — |
| 8 | −69.920 | 3.60 | 1.72825 | 28.5 |
| 9 | −17.754 | 1.20 | 1.80400 | 46.6 |
| 10 | 44.049 | 0.10 | — | — |
| 11 | 29.045 | 2.60 | 1.84666 | 23.8 |
| 12 | 84.385 | 17.11–8.11–3.04 | — | — |
| Diaphragm | ∞ | 1.20 | — | — |
| 13* | 32.014 | 3.20 | 1.58913 | 61.2 |
| 14 | 813.795 | 0.10 | — | — |
| 15 | 28.365 | 3.40 | 1.51633 | 64.1 |
| 16 | −183.545 | 1.37 | — | — |
| 17 | −29.178 | 1.10 | 1.62588 | 35.7 |
| 18 | −55037.039 | 6.72–2.96–1.00 | — | — |
| 19 | 38.529 | 3.00 | 1.58913 | 61.2 |
| 20 | −159.020 | 0.15 | — | — |
| 21 | 30.157 | 4.60 | 1.69680 | 55.5 |
| 22 | −40.923 | 0.10 | — | — |
| 23* | −506.806 | 1.00 | 1.80610 | 33.3 |
| 24 | 19.288 | 3.44 | — | — |
| 25 | −49.691 | 2.00 | 1.80100 | 35.0 |
| 26 | −37.872 | — | — | — |

* designates the aspherical surface which is rotationally symmetrical with respect to the optical axis.

Aspherical surface data (the aspherical surface coefficients not indicated are zero (0.00)):

[Embodiment 2]

| Surface No. 13 | K = 0.00 | A4 = 0.12000 × 10⁻⁴ |
|---|---|---|
| Surface No. 23 | K = −1.00 | A4 = −0.40066 × 10⁻⁴ |

Figure 5:
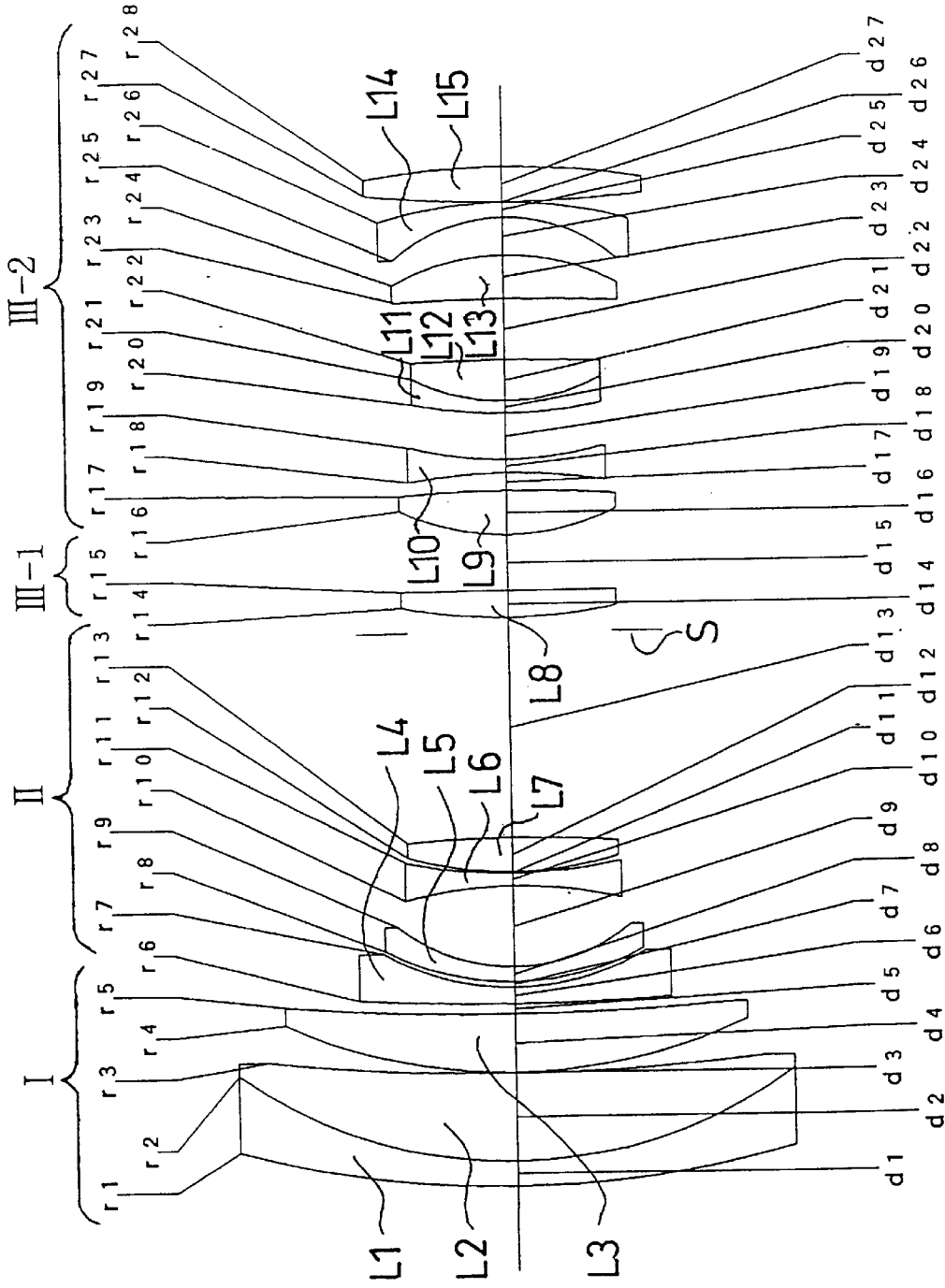
FIG. 5 is a lens arrangement of a second embodiment of a soft-focus zoom lens system according to the present invention.
Figure 6:
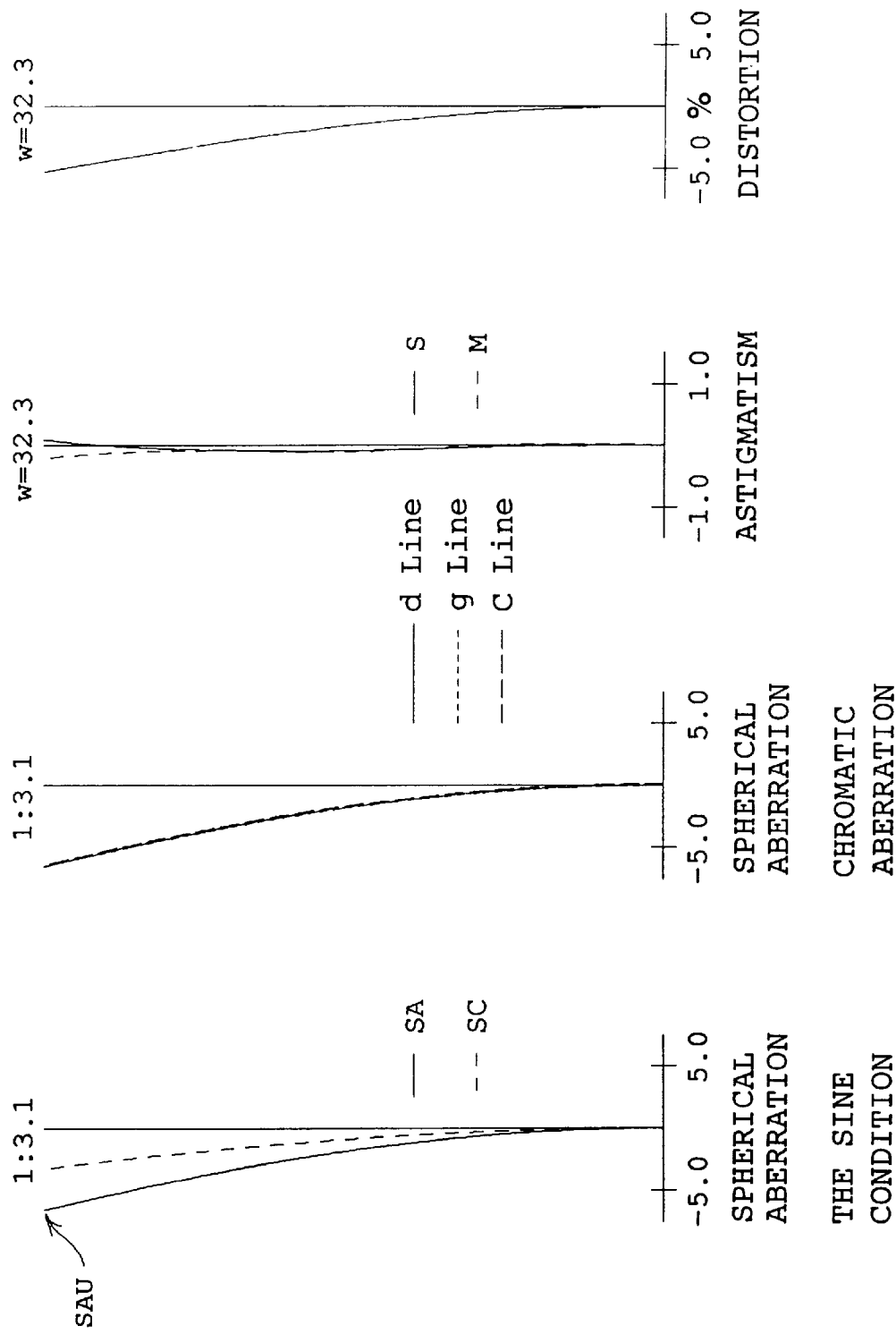
FIGS. 6A, 6B, 6C and 6D are aberration diagrams of the lens system of FIG. 5 at the short focal length extremity.
Figure 7:
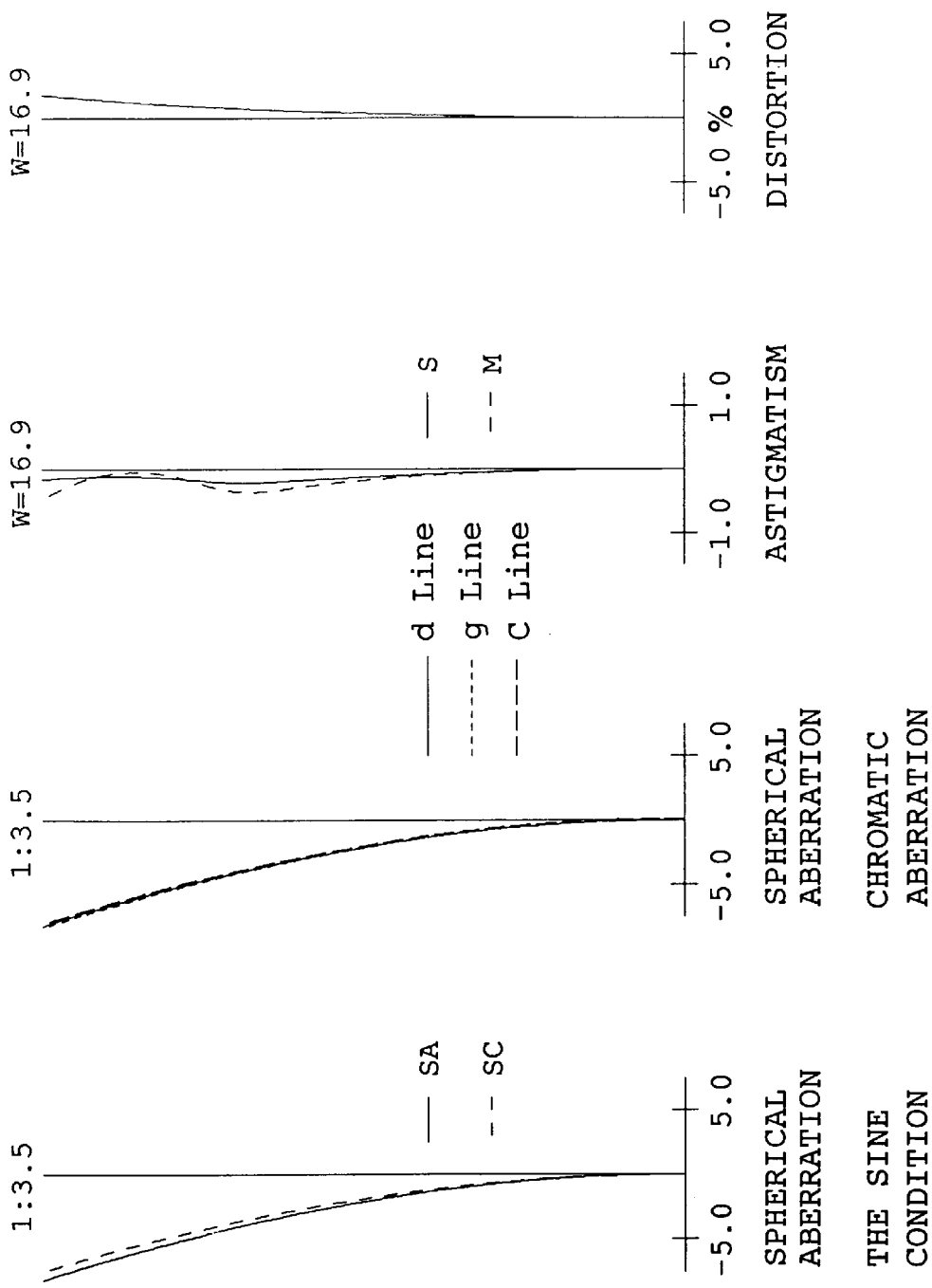
FIGS. 7A, 7B, 7C and 7D are aberration diagrams of the lens system of FIG. 5 at an intermediate focal length position.
Figure 8:
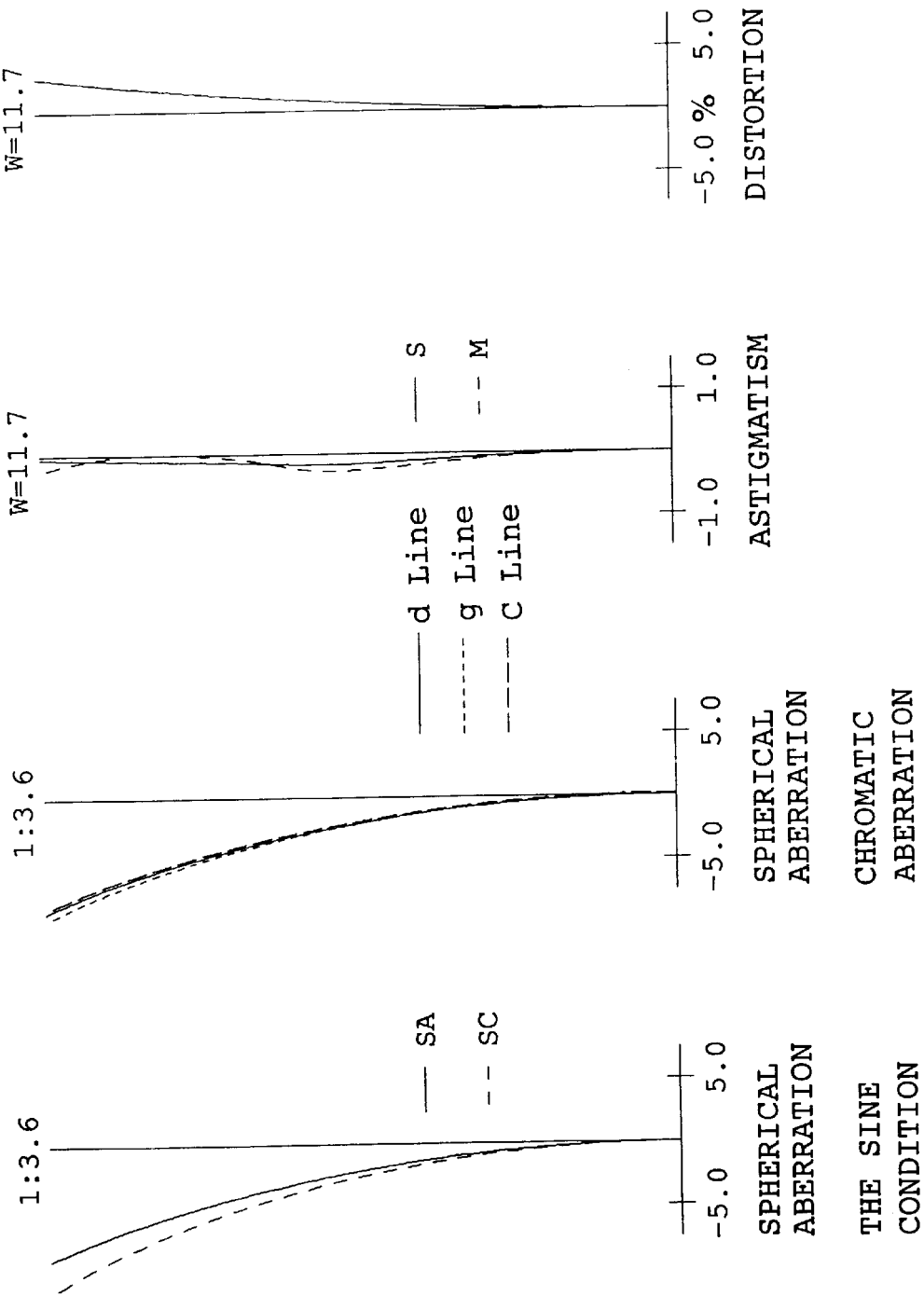
FIGS. 8A, 8B, 8C and 8D are aberration diagrams of the lens system of FIG. 5 at the long focal length extremity.

FIG. 5 is a lens arrangement of the second embodiment of a soft-focus zoom lens system, and Table 2 shows the numerical data thereof. The soft-focus zoom lens system includes the positive front lens group I, the negative intermediate lens group II, the diaphragm S and the positive rear lens group III, in this order from the object. Further, the rear lens group III includes the first sub lens group III-1 and the second sub lens group III-2 which are made relatively movable. Zooming from the short focal length extremity toward the long focal length extremity is performed as shown in the lens-group moving paths of FIG. 19, i.e., the front and rear lens groups I, III move toward the object, and the intermediate lens group II moves toward the image, while the axial distance between the front lens group I and the intermediate lens group II increases, and the axial distance between the intermediate lens group II and the rear lens group III decreases. The positive front lens group I includes a cemented lens group having a negative lens element L1 and a positive lens element L2, a positive meniscus lens element L3 having a convex surface facing toward the object, in this order from the object. The negative intermediate lens group II includes a negative meniscus lens element L4, a negative meniscus lens element L5, a negative lens element L6, and a positive lens element L7, in this order from the object. Further, in the rear lens group III, the first sub lens group III-1 includes a positive single meniscus lens element L8 having a convex surface facing toward the object; and the second sub lens group III-2 includes a positive lens element L9, a negative lens element L10, a cemented lens group having a negative meniscus lens element L11 and a positive lens element L12, a positive meniscus lens element L13 having a convex surface facing toward the image, a negative meniscus lens element L14 and a positive lens element L15, in this order from the object. FIGS. 6A through 6D are aberration diagrams of the lens system of FIG. 5 at the short focal length extremity. FIGS. 7A through 7D are aberration diagrams of the lens system of FIG. 5 at an intermediate focal length position. FIGS. 8A through 8D are aberration diagrams of the lens system of FIG. 5 at the long focal length extremity. The amount of SAU becomes the smallest at the short focal length extremity.

TABLE 2

$F_{NO} = 1:3.1–3.5–3.6$
$f = 36.12–70.01–101.89$ (Zoom Ratio = 2.82)
$W = 32.3–16.9–11.7$
$f_B = 38.35–46.73–49.06$
$SAU = -6.54$
$D_{23w} = 22.31$
$D_{12t} = 25.64$
$r_{R-1} = 54.706$

| Surface No. | ri | di | N | v |
|---|---|---|---|---|
| 1 | 103.692 | 2.50 | 1.80518 | 25.4 |
| 2 | 48.020 | 8.80 | 1.69680 | 55.5 |
| 3 | 206.063 | 0.10 | — | — |
| 4 | 55.454 | 5.90 | 1.75700 | 47.8 |
| 5 | 256.388 | 0.99–17.38–25.64 | — | — |
| 6 | 207.783 | 1.70 | 1.83481 | 42.7 |
| 7 | 25.867 | 0.54 | — | — |
| 8 | 26.913 | 1.50 | 1.77250 | 49.6 |

TABLE 2-continued

| Surface No. | ri | di | N | ν |
|---|---|---|---|---|
| 9 | 18.155 | 8.08 | — | — |
| 10 | −43.965 | 1.30 | 1.72916 | 54.7 |
| 11 | 50.721 | 0.15 | — | — |
| 12 | 36.336 | 3.40 | 1.80518 | 25.4 |
| 13 | −161.141 | 20.81–8.44–1.00 | — | — |
| Diaphragm | ∞ | 1.50 | — | — |
| 14* | 54.706 | 2.70 | 1.69680 | 55.5 |
| 15 | 2926.617 | 5.65–1.18–0.80 | — | — |
| 16 | 23.722 | 4.47 | 1.80610 | 40.9 |
| 17 | −166.959 | 1.82 | — | — |
| 18 | −59.918 | 1.35 | 1.80518 | 25.4 |
| 19 | 35.127 | 4.65 | — | — |
| 20 | 43.126 | 1.25 | 1.80610 | 40.9 |
| 21 | 20.277 | 4.07 | 1.48749 | 70.2 |
| 22 | −249.542 | 6.13 | — | — |
| 23 | −231.317 | 4.39 | 1.62230 | 53.2 |
| 24 | −23.389 | 3.80 | — | — |
| 25 | −16.846 | 1.50 | 1.83481 | 42.7 |
| 26 | −43.553 | 0.10 | — | — |
| 27 | 128.272 | 3.50 | 1.65844 | 50.9 |
| 28 | −84.587 | — | — | — |

*designates the aspherical surface which is rotationally symmetrical with respect to the optical axis.

Aspherical surface data (the aspherical surface coefficients not indicated are zero (0.00)):

| [Embodiment 3] | | |
|---|---|---|
| Surface No. 14 | K = 0.00 | A4 = 0.50000 × 10⁻⁵ |

Figure 9:
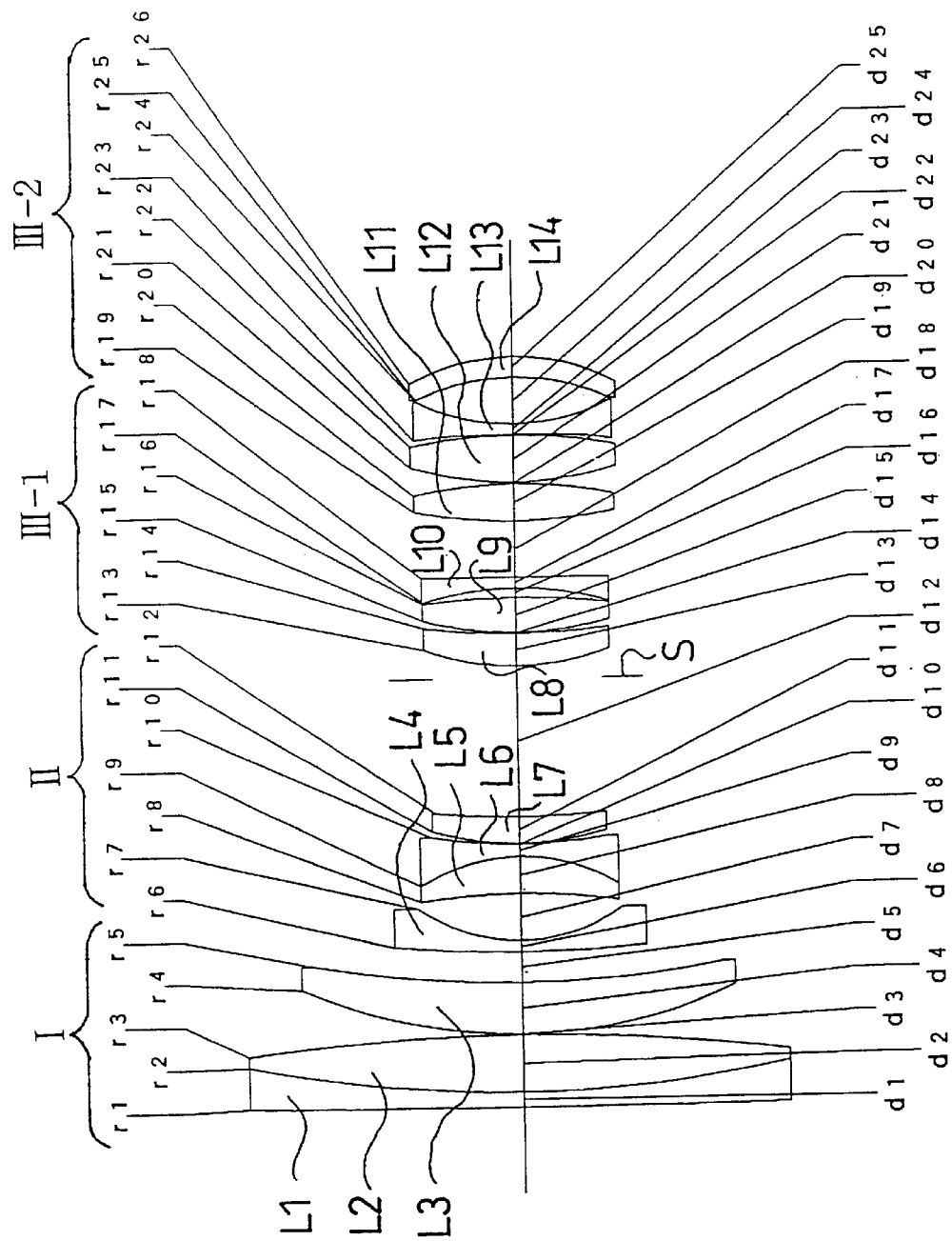
FIG. 9 is a lens arrangement of a third embodiment of a soft-focus zoom lens system according to the present invention.
Figure 10:
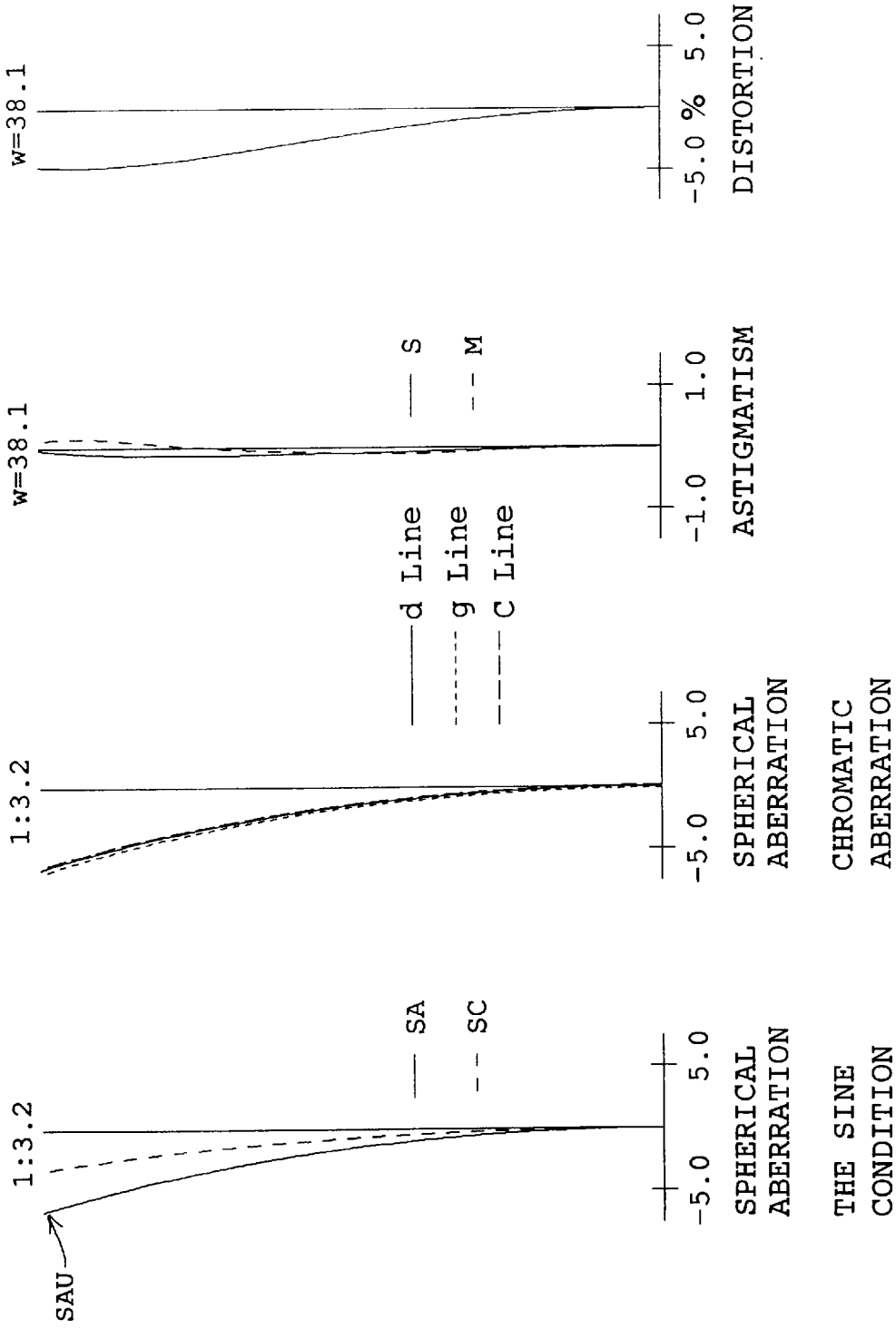
FIGS. 10A, 10B, 10C and 10D are aberration diagrams of the lens system of FIG. 9 at the short focal length extremity.
Figure 11:
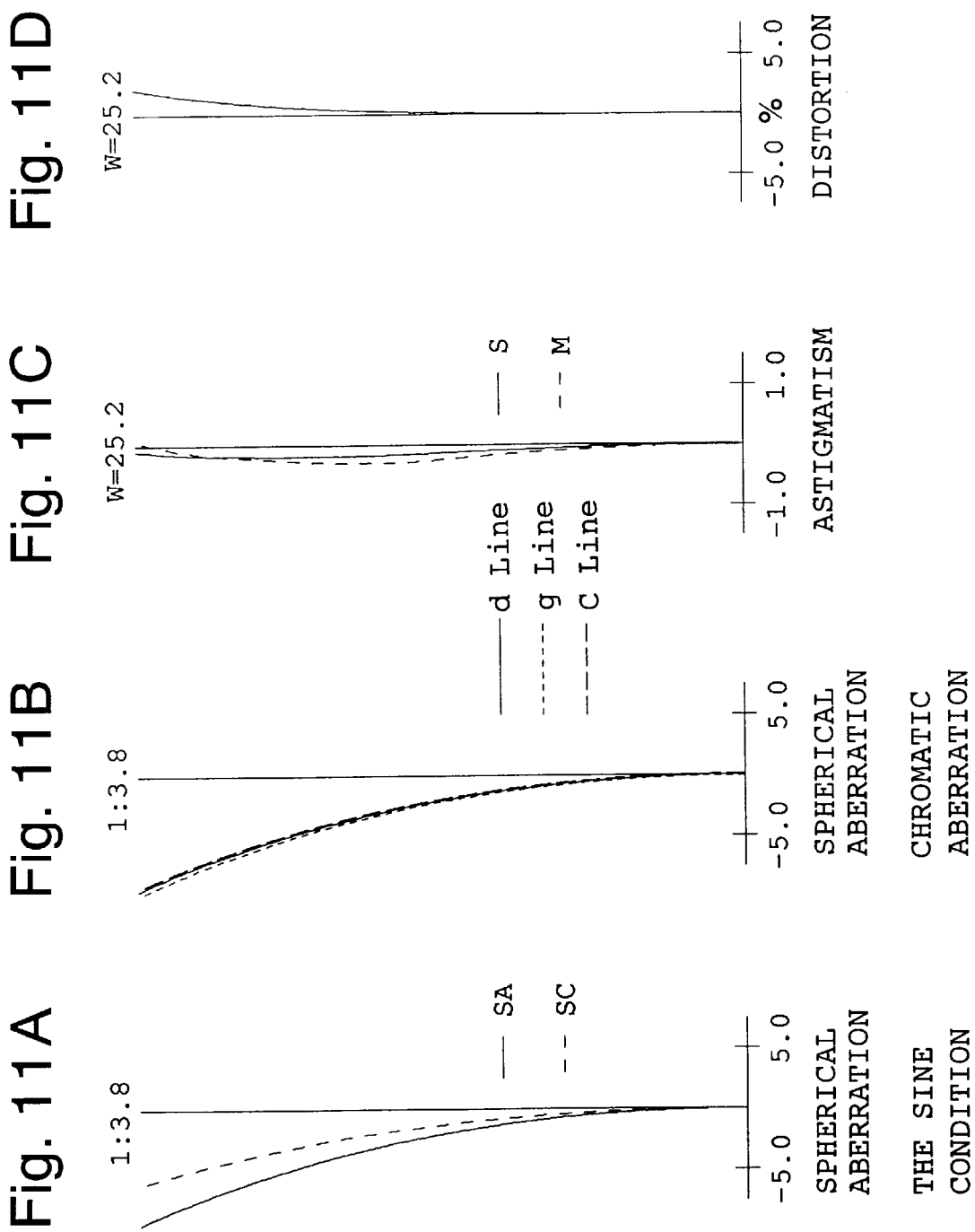
FIGS. 11A, 11B, 11C and 11D are aberration diagrams of the lens system of FIG. 9 at an intermediate focal length position.
Figure 12:
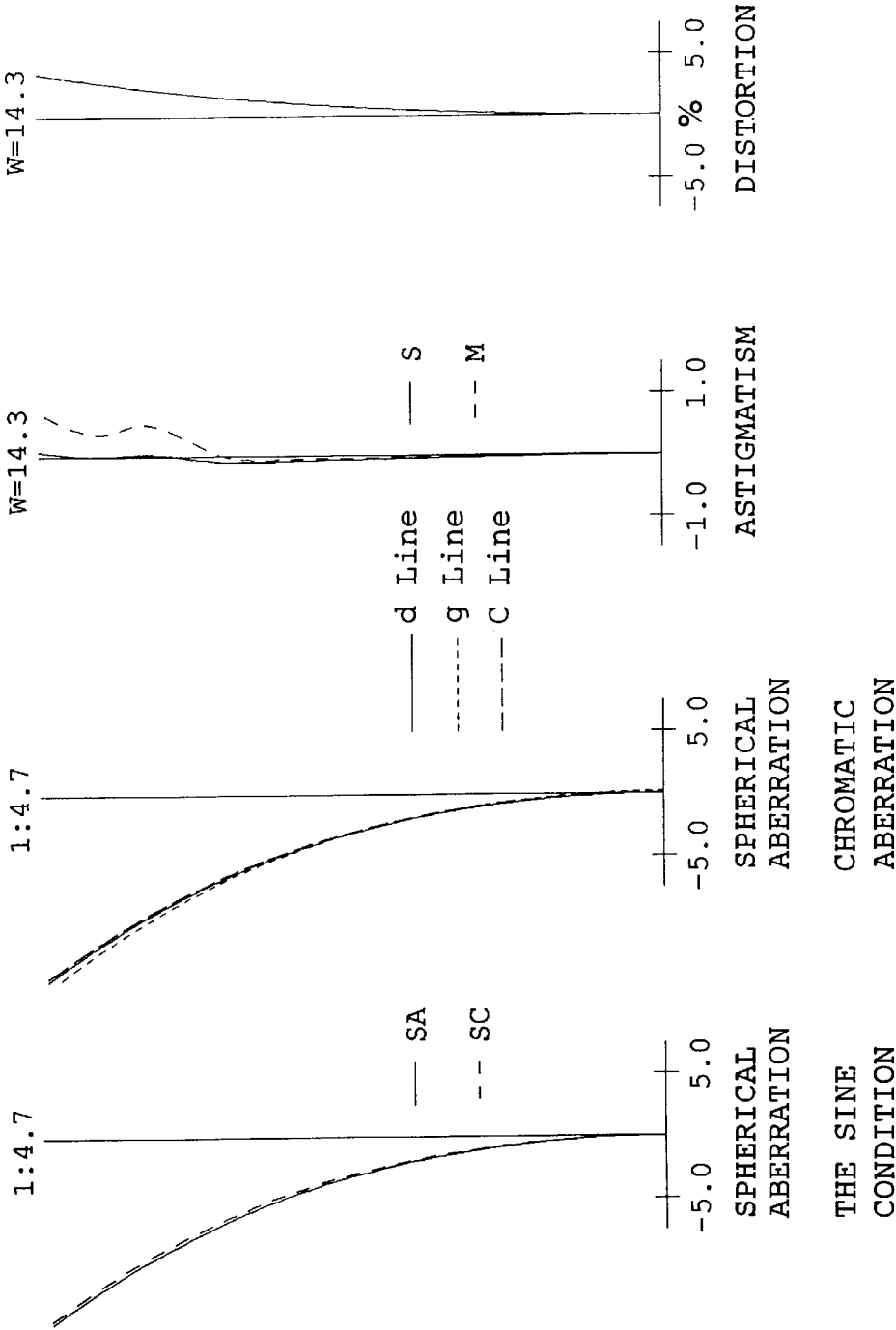
FIGS. 12A, 12B, 12C and 12D are aberration diagrams of the lens system of FIG. 9 at the long focal length extremity.

FIG. 9 is a lens arrangement of the third embodiment of a soft-focus zoom lens system, and Table 3 shows the numerical data thereof. FIGS. 10A through 10D are aberration diagrams of the lens system of FIG. 9 at the short focal length extremity. FIGS. 11A through 11D are aberration diagrams of the lens system of FIG. 9 at an intermediate focal length position. FIGS. 12A through 12D are aberration diagrams of the lens system of FIG. 9 at the long focal length extremity. The basic lens arrangement is the same as that of the first embodiment. The amount of SAU becomes the smallest at the short focal length extremity.

TABLE 3

$F_{NO} = 1:3.2–3.8–4.7$
f = 28.91–45.00–82.00 (Zoom Ratio = 2.84)
W = 38.1–25.2–14.3
$f_B$ = 41.52–52.15–68.44
SAU = −6.56
$D_{23w}$ = 14.81
$D_{12t}$ = 27.15
$r_{R-1}$ = 24.716

| Surface No. | ri | di | N | ν |
|---|---|---|---|---|
| 1 | 1519.075 | 1.50 | 1.84666 | 23.8 |
| 2 | 124.575 | 5.60 | 1.69680 | 55.5 |
| 3 | −202.759 | 0.10 | — | — |
| 4 | 51.063 | 5.00 | 1.69680 | 55.5 |
| 5 | 109.170 | 3.00–13.06–27.15 | — | — |
| 6 | 123.289 | 1.10 | 1.80400 | 46.6 |
| 7 | 16.564 | 4.60 | — | — |
| 8 | −61.473 | 3.60 | 1.72825 | 28.5 |
| 9 | −17.635 | 1.20 | 1.80400 | 46.6 |
| 10 | 48.330 | 0.10 | — | — |
| 11 | 30.183 | 2.60 | 1.84666 | 23.8 |
| 12 | 85.318 | 13.61–8.10–2.83 | — | — |
| Diaphragm | ∞ | 1.20 | — | — |
| 13 | 24.716 | 3.20 | 1.58913 | 61.2 |

TABLE 3-continued

| Surface No. | ri | di | N | ν |
|---|---|---|---|---|
| 14 | 71.151 | 0.10 | — | — |
| 15 | 33.928 | 3.40 | 1.51633 | 64.1 |
| 16 | −73.522 | 0.90 | — | — |
| 17 | −31.236 | 1.10 | 1.62588 | 35.7 |
| 18 | 5065.591 | 5.57–3.21–1.01 | — | — |
| 19 | 48.466 | 3.62 | 1.58913 | 61.2 |
| 20 | −45.084 | 0.15 | — | — |
| 21 | 31.837 | 4.60 | 1.69680 | 55.5 |
| 22 | −49.353 | 0.10 | — | — |
| 23* | −229.852 | 1.00 | 1.80610 | 33.3 |
| 24 | 20.292 | 4.54 | — | — |
| 25 | −21.624 | 2.00 | 1.80100 | 35.0 |
| 26 | −20.849 | — | — | — |

* designates the aspherical surface which is rotationally symmetrical with respect to the optical axis.

Aspherical surface data (the aspherical surface coefficients not indicated are zero (0.00)):

| [Embodiment 4] | | |
|---|---|---|
| Surface No. 23 | K = −1.00 | A4 = −0.35072 × 10⁻⁴ |

Embodiment 4

Figure 13:
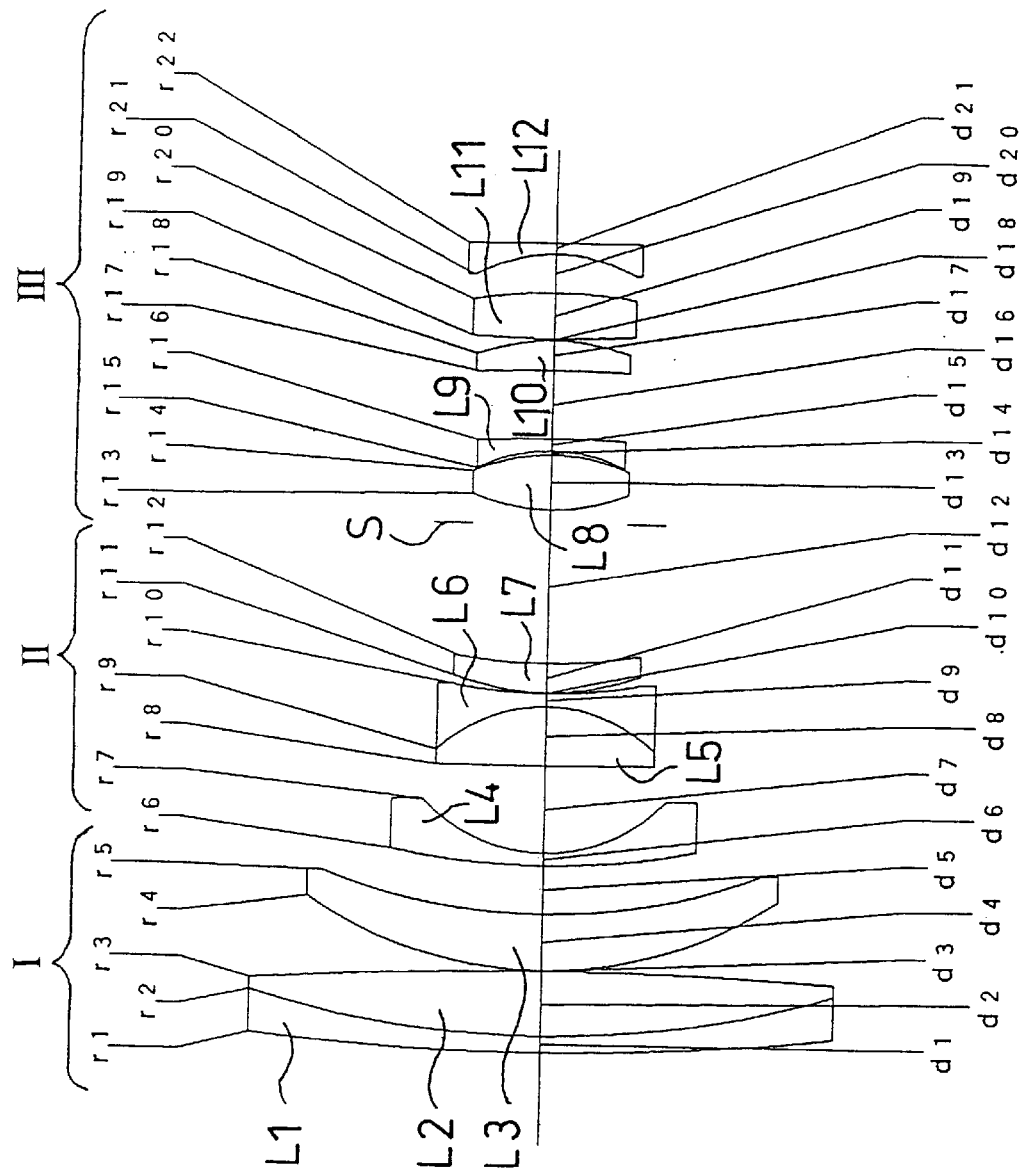
FIG. 13 is a lens arrangement of a fourth embodiment of a soft-focus zoom lens system according to the present invention.
Figures 16A, 16B, 16C, 16D:
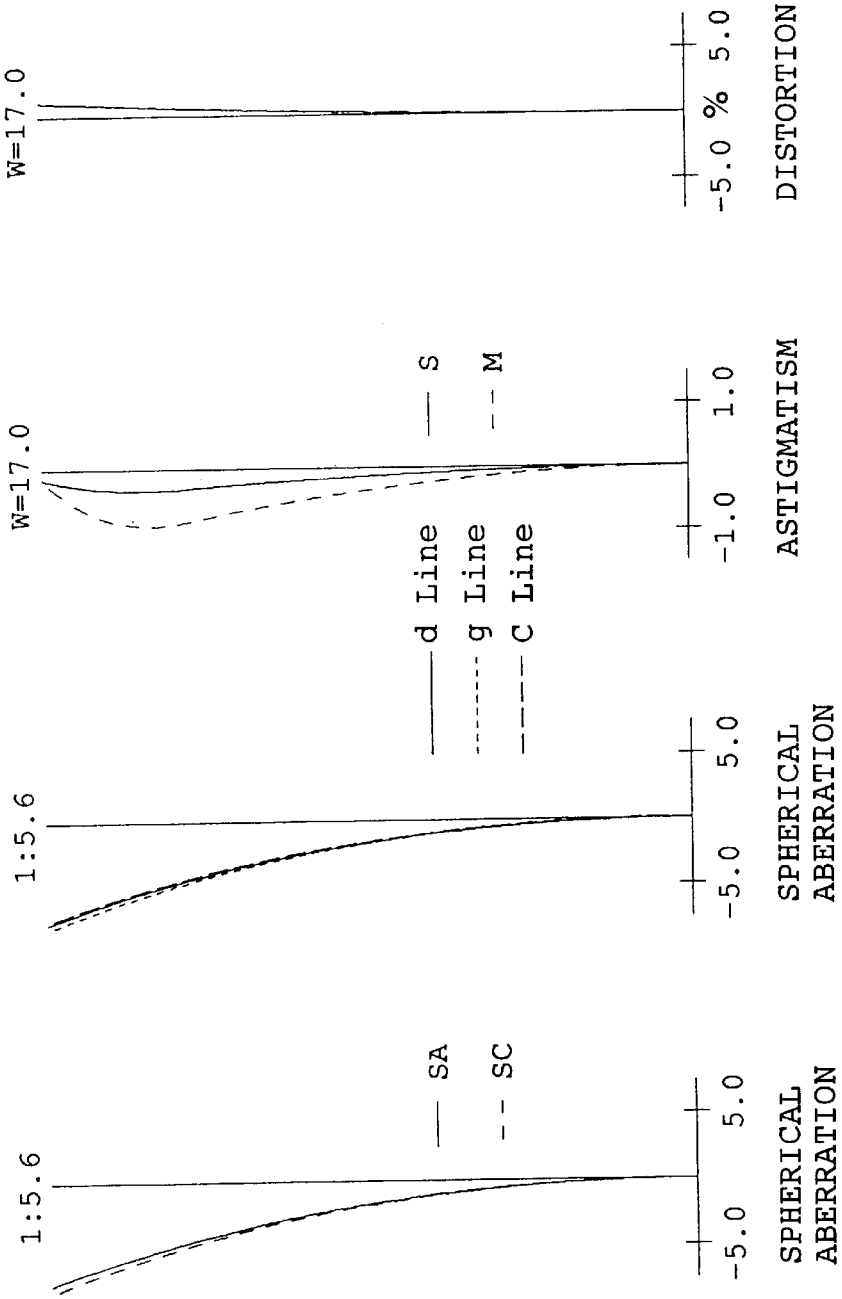
FIGS. 16A, 16B, 16C and 16D are aberration diagrams of the lens system of FIG. 13 at the long focal length extremity.

FIG. 13 is a lens arrangement of the fourth embodiment of a soft-focus zoom lens system, and Table 4 shows the numerical data thereof. The wide-angle soft-focus zoom lens system includes the positive front lens group I, the negative intermediate lens group II, the diaphragm S and the positive rear lens group III, in this order from the object. Zooming from the short focal length extremity toward the long focal length extremity is performed as shown in the lens-group moving paths of FIG. 17, i.e., all the lens groups I, II and III move toward the object, while the axial distance between the front lens group I and the intermediate lens group II increases, and the axial distance between the intermediate lens group II and the rear lens group III decreases. The positive front lens group I includes a cemented lens group having a negative lens element L1 and a positive lens element L2, a positive meniscus lens element L3 having a convex surface facing toward the object, in this order from the object. The negative intermediate lens group II includes a negative meniscus lens element L4, a cemented lens group having a positive lens element L5 and a negative lens element L6, and a positive meniscus lens element L7, in this order from the object. Further, the rear lens group III includes a positive lens element L8, a negative meniscus lens element L9, a positive meniscus lens element L10, a positive lens element L11 and a negative meniscus lens element L12, in this order from the object. FIGS. 14A through 14D are aberration diagrams of the lens system of FIG. 13 at the short focal length extremity. FIGS. 15A through 15D are aberration diagrams of the lens system of FIG. 13 at an intermediate focal length position. FIGS. 16A through 16D are aberration diagrams of the lens system of FIG. 13 at the long focal length extremity. The amount of SAU becomes the smallest at the short focal length extremity.

TABLE 4

$F_{NO}$ = 1:4.3–4.8–5.6
f = 34.50–49.96–70.00 (Zoom Ratio = 2.03)
W = 33.2–23.4–17.0
$f_B$ = 38.50–44.09–52.05
SAU = –5.35
$D_{23w}$ = 13.85
$D_{12t}$ = 23.59
$r_{R-1}$ = 17.708

| Surface No. | ri | di | N | ν |
|---|---|---|---|---|
| 1 | 217.901 | 1.50 | 1.84666 | 23.8 |
| 2 | 89.378 | 5.89 | 1.65844 | 50.9 |
| 3 | –464.394 | 0.10 | — | — |
| 4 | 38.347 | 5.00 | 1.69680 | 55.5 |
| 5 | 54.807 | 4.39–16.64–23.59 | — | — |
| 6 | 69.474 | 1.10 | 1.80440 | 39.6 |
| 7 | 15.035 | 7.85 | — | — |
| 8 | 1001.820 | 5.26 | 1.74077 | 27.8 |
| 9 | –14.511 | 1.20 | 1.78300 | 36.1 |
| 10 | 44.447 | 0.10 | — | — |
| 11 | 24.082 | 2.60 | 1.84666 | 23.8 |
| 12 | 46.226 | 12.65–7.14–2.09 | — | — |
| Diaphragm | ∞ | 1.20 | — | — |
| 13 | 17.708 | 5.00 | 1.48749 | 70.2 |
| 14 | –17.064 | 0.36 | — | — |
| 15 | –15.159 | 1.10 | 1.62004 | 36.3 |
| 16 | –130.787 | 6.12 | — | — |
| 17 | –188.532 | 2.67 | 1.61800 | 63.4 |
| 18 | –20.102 | 0.15 | — | — |
| 19 | 107.024 | 4.14 | 1.77250 | 49.6 |
| 20 | –44.701 | 3.45 | — | — |
| 21 | –14.926 | 1.00 | 1.70035 | 37.9 |
| 22 | –723.881 | — | — | — |

Table 5 shows the numerical value of each condition in embodiments 1 through 4.

TABLE 5

| | Embod. 1 | Embod. 2 | Embod. 3 | Embod. 4 |
|---|---|---|---|---|
| Cond. (1) | –0.149 | –0.181 | –0.227 | –0.155 |
| Cond. (2) | 0.737 | 0.618 | 0.512 | 0.401 |
| Cond. (3) | 0.309 | 0.252 | 0.331 | 0.337 |
| Cond. (4) | 1.288 | 1.515 | 0.855 | 0.513 |
| Cond. (5) | 42.18 | 32.32 | 38.14 | 33.16 |

As can be understood by Table 5, embodiments 1 through 4 satisfy conditions (1) through (5), and the various aberrations are sufficiently corrected, as shown in the aberration diagrams.

According to the present invention, a soft-focus zoom lens system through which a soft-focusing effect can be obtained in photographing of both distant views, such as landscapes, and portraits can be obtained.

What is claimed is:

1. A soft-focus zoom lens system comprising a positive front lens group, a negative intermediate lens group, and a positive rear lens group, in this order from an object;

wherein zooming is performed by respectively moving said front lens group, said intermediate lens group, and said rear lens group, along the optical axis; and wherein said zoom lens system satisfies the following conditions:

$SAU/fw < -0.10$ $0.30 < D_{23w}/fw$ $0.25 < D_{12t}/ft$ wherein

SAU designates the amount of spherical aberration at an open aperture, with respect to a focal length at which the amount of spherical aberration, upon zooming, becomes the smallest;

fw designates the focal length of the entire lens system at the short focal length extremity;

$D_{23w}$ designates the axial distance, at the short focal length extremity, between the most image-side surface of said intermediate lens group and the most object-side surface of said rear lens group;

$D_{12t}$ designates the axial distance, at the long focal length extremity, between the most image-side surface of said front lens group and the most object-side surface of said intermediate lens group; and ft designates the focal length of the entire zoom lens system at the long focal length extremity.

2. The soft-focus zoom lens system according to claim 1, wherein said rear lens group comprises at least one positive lens element;

wherein a diaphragm is positioned between said intermediate lens group and said rear lens group; and wherein said zoom lens system satisfies the following condition:

$0.5 < r_{R-1}/fw < 1.6$ wherein $r_{R-1}$ designates the radius of curvature of the object-side surface of the most object-side positive lens element in said rear lens group.

3. The soft-focus zoom lens system according to claim 1, wherein said zoom lens system satisfies the following condition:

$25° < Ww$ wherein

Ww designates the half angle-of-view at the short focal length extremity.

4. The soft-focus zoom lens system according to claim 1, wherein said rear lens group comprises two sub lens groups which reduce the axial distance therebetween when zooming is performed from the short focal length extremity toward the long focal length extremity.

* * * * *